US011979289B2

(12) United States Patent
Mwanje et al.

(10) Patent No.: US 11,979,289 B2
(45) Date of Patent: May 7, 2024

(54) COORDINATED CONTROL OF NETWORK AUTOMATION FUNCTIONS

(71) Applicant: NOKIA TECHNOLOGIES OY, Espoo (FI)

(72) Inventors: Stephen Mwanje, Dorfen (DE); Janne Tapio Ali-Tolppa, Taufkirchen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/916,673

(22) PCT Filed: Apr. 3, 2020

(86) PCT No.: PCT/IB2020/053233
§ 371 (c)(1),
(2) Date: Oct. 3, 2022

(87) PCT Pub. No.: WO2021/198743
PCT Pub. Date: Oct. 7, 2021

(65) Prior Publication Data
US 2023/0171158 A1 Jun. 1, 2023

(51) Int. Cl.
*H04L 41/08* (2022.01)
*H04L 41/042* (2022.01)
(Continued)

(52) U.S. Cl.
CPC ........ *H04L 41/0886* (2013.01); *H04L 41/042* (2013.01); *H04L 41/0873* (2013.01); *H04L 43/091* (2022.05)

(58) Field of Classification Search
CPC .............. H04L 41/0886; H04L 41/042; H04L 41/0873; H04L 43/091
(Continued)

(56) References Cited

U.S. PATENT DOCUMENTS 8,214,238 B1 * 7/2012 Fairfield ............ G06Q 30/0203
705/7.29
8,898,633 B2 * 11/2014 Bryant ................ G05B 19/056
717/124
(Continued)

FOREIGN PATENT DOCUMENTS

| WO | 2018/042232 A1 | 3/2018 |
| WO | 2018/233818 A1 | 12/2018 |
| WO | 2020/015831 A1 | 1/2020 |

OTHER PUBLICATIONS

S. Mwanje et al., "Network Management Automation in 5G: Challenges and Opportunities," in Proc. of the 27th IEEE International Symposium on Personal, Indoor and Mobile Radio Communications (PIMRC), Valenica, Spain, Sep. 4-7, 2016.
(Continued)

*Primary Examiner* — Thu Ha T Nguyen
(74) *Attorney, Agent, or Firm* — Robert P. Michal, Esq.; Carter, DeLuca & Farrell LLP

(57) ABSTRACT

It is provided a method, comprising monitoring if a generic objective for a network is received; translating the generic objective into specific objectives based on a behavioral matrix if the generic objective is received, wherein each of the specific objectives is specific for a respective network element; requesting, for each of the specific objectives, an automation function of the respective network element to achieve the specific objective, identifying, for each of the specific objectives, based on a stored association table, a distributed control function controlling the automation function of the respective network element; informing, for each of the specific objectives, the identified distributed control function on the specific objective for the respective network element; supervising if a feedback is received from one of the distributed control functions, wherein the feedback indicates to which degree one of the specific objectives is
(Continued)

achieved; adapting the behavioral matrix based on the feedback.

7 Claims, 4 Drawing Sheets

(51) Int. Cl.
  *H04L 41/0873* (2022.01)
  *H04L 43/091* (2022.01)
(58) Field of Classification Search
  USPC .................................................. 709/223, 224
  See application file for complete search history.

(56) References Cited

U.S. PATENT DOCUMENTS

| | | | | |
|---|---|---|---|---|
| 10,567,288 | B1* | 2/2020 | Mutnuru | H04L 41/40 |
| 2001/0020251 | A1* | 9/2001 | Sheikh | H04L 41/22 |
| | | | | 709/224 |
| 2008/0133717 | A1* | 6/2008 | Bouchat | H04L 41/046 |
| | | | | 709/220 |
| 2010/0005161 | A1* | 1/2010 | Pollakowski | H04L 43/18 |
| | | | | 709/223 |
| 2013/0013752 | A1* | 1/2013 | Herrera Van Der Nood | |
| | | | | H04L 41/0889 |
| | | | | 709/220 |
| 2014/0215028 | A1* | 7/2014 | Donner | H04L 41/16 |
| | | | | 709/220 |
| 2015/0363478 | A1* | 12/2015 | Haynes | G06Q 10/06 |
| | | | | 707/610 |
| 2015/0363481 | A1* | 12/2015 | Haynes | G06Q 10/10 |
| | | | | 707/748 |
| 2016/0105316 | A1* | 4/2016 | Guntaka | H04L 49/15 |
| | | | | 370/254 |
| 2017/0011606 | A1* | 1/2017 | Ceccon | G06Q 20/18 |
| 2018/0069768 | A1* | 3/2018 | Zhang | H04L 41/0896 |
| 2018/0219793 | A1* | 8/2018 | Ji | H04L 67/146 |
| 2019/0158578 | A1* | 5/2019 | Ramasamy | H04L 41/0886 |
| 2019/0222480 | A1* | 7/2019 | Smith | H04L 41/02 |
| 2019/0356567 | A1* | 11/2019 | Martin | H04L 41/22 |
| 2020/0044930 | A1* | 2/2020 | Stafford | H04L 41/0896 |
| 2020/0400957 | A1* | 12/2020 | Van Heugten | G02B 27/0172 |
| 2021/0083922 | A1* | 3/2021 | Althaus | H04L 41/042 |
| 2021/0297322 | A1* | 9/2021 | Yu | H04L 41/14 |

OTHER PUBLICATIONS

Stephen S Mwanje, Lars Christoph Schmelz, Andreas Mitschele-Thiel, "Cognitive Cellular Networks: A Q-Learning Framework for Self-Organizing Networks", IEEE Transactions on Network and Service Management, vol. 13, Issue 1, pp. 85-98, Mar. 2016.
International Search Report and Written Opinion dated Dec. 3, 2020 corresponding to International Patent Application No. PCT/IB2020/053233.
Hewlett-Packard Enterprise: "Draft—DGR/ZSM-05ed111_Autom v0.3.0 (GR ZSM 005) Means of Automation," ETSI Draft; ZSM (20) 000019, Jan. 6, 2020, pp. 1-79, XP014358545.

* cited by examiner

COORDINATED CONTROL OF NETWORK AUTOMATION FUNCTIONS

FIELD OF THE INVENTION

The present invention relates to network operations, administration, and management. In particular, it relates to Cognitive Autonomous Networks (CAN), e.g. in 5G (radio access) networks and other (future) generations of wireless/mobile networks or wired networks.

ABBREVIATIONS

3GPP 3rd Generation Partnership Project
3G/4G/5G $3^{rd}/4^{th}/5^{th}$ Generation
AQI Action Quality Indicator
BS Base Station
C3F Control, Coordination, and Configuration Function
C4F Central Control, Coordination, and Configuration Function
CAN Cognitive Autonomous Network
CF Cognitive Function
C-NAF Central NAF
CNM Cognitive Network Management
CSON Centralized SON
DC3 Distributed Control, Coordination, and Configuration
D-NAF Distributed NAF
eNB evolved Node B
gNB next generation Node B
KPI Key Performance Indicator
NAF Network Automation Function
NE Network Element
NM Network Management
OAM Operations, Administration and Management
RAN Radio Access Network
SON Self-Organizing Network
WiFi Wireless Fidelity

BACKGROUND OF THE INVENTION

With the success of Self Organizing Networks (SON), but also its shortcomings in terms of flexibility and adaptability to changing and complex environments, there is a strong demand for more intelligence and autonomy in network Operations, Administration and Management (OAM). The objective of CAN [1,2] is that OAM functions should be able to: 1) take higher level goals and derive the appropriate performance targets, 2) learn from their environment and their individual or shared experiences therein, 3) learn to contextualize their operating conditions and, 4) learn their optimal behavior fitting to the specific environment and contexts. This learning shall be based on all kinds of data available in the network (including, for example, performance information, failures, configuration data, network planning data, or user and service-related data) as well as from the actions and the corresponding impact of the OAM function itself. The learning and the knowledge built from the learned information shall thereby increase the autonomy of the OAM functions.

Current and future networks will, presumably for a long-time, support both learning based Cognitive Functions (CFs) and non-learning-based SON Functions (SFs), each with a single objective, for which the function proposes recommendations and/or policy changes to be executed on the network. Both kinds of functions, together called Network Automation Functions (NAFs), must coexist and ensure to achieve the desired end-to-end network performance objectives. The individual NAFs do not take responsibility for end-to-end performance, instead a separate functionality must be responsible for the Control Coordination & Configuration of these functions, especially as the individual CFs in a CAN system are in the future likely to be provided by multiple vendors.

There have been multiple proposals for control and coordination functionality in network automation systems. In SON, there was the concept of a coordinator whose responsibility was limited to the coordination of conflicts among functions. This assumed that the coordinator had full visibility over the proposed actions of all the functions and the ability to either accept or reject them, which is not always the case. E.g. if the coordinator is centralized while some SON functions are distributed in the eNBs, the coordinator does not have a full overview. This implies that the coordinator is unable to control or supervise appropriately the individual distributed functions. Moreover, the use of cognitive functions can pose additional challenges for the SON coordination.

In Cognitive systems, the responsible functional unit, which may simply be called a controller, ensures that the individual functions do not cause adverse effects to one another and that they do not conflict for the network resources, be it during learning or when exploiting the knowledge. For example, [3] proposes two functions, the Coordination engine and the Configuration Management Engine which are respectively responsible for learning the coordination effects among the function and reconfiguring the functions as may be necessary. As illustrated by FIG. 1, these functions may be integrated into a single Control, Coordination and Configuration function (C3F) that is responsible for the end-to-end performance of the Cognitive Autonomous Network (CAN), with functionality to:

Ensure proper concurrency control among CFs
Learn and implement coordination decisions among multiple CFs, and
(Re)configure the CF in line with the desired end to end goals.

In general, the C3F (also denoted as "the controller") learns to coordinate the behaviour of the individual network automation function via a closed loop in which a given NAF A (an actor) proposes a change on the network, which is then evaluated by the controller (together with the proposals made by other NAFs). Based on the evaluation, the controller advises the actor NAF A if/how to improve its recommendations. The evaluation may be in form of an Action Quality Indicator (AQI) as proposed in [4].

According to the AQI concept, following an action from a given CF, the peer functions grade their observed effects with the AQIs as the grades. The peers then report these grades (the AQIs) to the active CF which then aggregates them to learn how good or bad the action was on the entire network. However, this proposal has the limitation that all CFs must implement this coordination mechanism and still requires a controller that schedules the execution times of the different CFs.

REFERENCES

[1] S. Mwanje et al., "Network Management Automation in 5G: Challenges and Opportunities," in Proc. of the 27th IEEE International Symposium on Personal, Indoor and Mobile Radio Communications (PIMRC), Valenica, Spain, Sep. 4-7, 2016

[2] Stephen S Mwanje, Lars Christoph Schmelz, Andreas Mitschele-Thiel, "Cognitive Cellular Networks: A Q-Learning Framework for Self-Organizing Networks", IEEE Transactions on Network and Service Management, Vol 13, Issue 1, Pages 85-98, 2016/3
[3] PCT/IB2016/055288, "Method and Apparatus for Providing Cognitive Functions and Facilitating management in Cognitive Network Management Systems" filed Sep. 2, 2016
[4] PCT/EP2017/065160 Coordinated network optimization by cognitive network management

SUMMARY OF THE INVENTION

It is an object of the present invention to improve the prior art.

According to a first aspect of the invention, there is provided an apparatus, comprising means for monitoring if a generic objective for a network comprising a plurality of network elements is received; means for translating the generic objective into a plurality of specific objectives based on a behavioral matrix if the generic objective is received, wherein each of the specific objectives is specific for a respective network element of the plurality of network elements; means for requesting, for each of the specific objectives, an automation function of the respective network element to achieve the specific objective, means for identifying, for each of the specific objectives, based on a stored association table, a distributed control function controlling the automation function of the respective network element; means for informing, for each of the specific objectives, the identified distributed control function on the specific objective for the respective network element; means for supervising if a feedback is received from one of the distributed control functions, wherein the feedback indicates if or to which degree one of the specific objectives is achieved; means for adapting the behavioral matrix based on the feedback if the feedback is received.

According to a second aspect of the invention, there is provided an apparatus, comprising means for monitoring if a specific objective for a first network element is received from a central control function; means for coordinating, if the specific objective is received, automation functions of a plurality of network elements including the first network element, thus attempting to achieve specific objectives for the network elements of the plurality of network elements including the specific objective for the first network element; means for supervising if each network element of the plurality of network elements achieves its respective specific objective; means for providing, to the central control function, a feedback indicating that one network element of the plurality of network elements does not achieve its respective specific objective if one network element of the plurality of network elements does not achieve its respective specific objective.

According to a third aspect of the invention, there is provided a method, comprising monitoring if a generic objective for a network comprising a plurality of network elements is received; translating the generic objective into a plurality of specific objectives based on a behavioral matrix if the generic objective is received, wherein each of the specific objectives is specific for a respective network element of the plurality of network elements; requesting, for each of the specific objectives, an automation function of the respective network element to achieve the specific objective, identifying, for each of the specific objectives, based on a stored association table, a distributed control function controlling the automation function of the respective network element; informing, for each of the specific objectives, the identified distributed control function on the specific objective for the respective network element; supervising if a feedback is received from one of the distributed control functions, wherein the feedback indicates if or to which degree one of the specific objectives is achieved; adapting the behavioral matrix based on the feedback if the feedback is received.

According to a fourth aspect of the invention, there is provided a method, comprising monitoring if a specific objective for a first network element is received from a central control function; coordinating, if the specific objective is received, automation functions of a plurality of network elements including the first network element, thus attempting to achieve specific objectives for the network elements of the plurality of network elements including the specific objective for the first network element; supervising if each network element of the plurality of network elements achieves its respective specific objective; providing, to the central control function, a feedback indicating that one network element of the plurality of network elements does not achieve its respective specific objective if one network element of the plurality of network elements does not achieve its respective specific objective.

Each of the methods of the third and fourth aspects may be a method for coordinated control of network automation functions.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some example embodiments of the invention, at least one of the following advantages may be achieved: Separating the control and coordination function into a network wide (central) part and an NE specific part (or a part related to a portion of the network only) ensures that the individual automation function in the NE are coordinated but without having to rely on a centralized coordinator that may be too slow for distributed coordination and control as required by the NEs. Moreover, given the high likeliness for a multi-vendor interface between the centralized function and the distributed functions, a simple multi-vendor interface is provided, which allows the distributed part to be independent of the centralized part. Also distributed control and coordination functions allow for horizontal coordination among the NEs, e.g. across the X2 or Xn interface.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

In a typical deployment, network automation includes both distributed NAFs located in the network elements or in an edge cloud (responsible for a subset of the NEs in the network) and one or more centralized NAFs in the OAM center/centers responsible for the entire network or at least a larger portion thereof. The distributed and centralized NAFs may operate in different time scales. Typically, the functions controlling network elements with latency requirements are deployed towards the edge, while functions requiring data from a wider context operating at a longer cycle are deployed in a more centralized fashion. The control functionality should be able to control these different kinds of functions in a coordinated way. It is, however, hard for a single coordination function (typically assumed to be centralized) to fully manage the functions at the different levels. This is mainly because the coordinator may not always have full control over all the functions, e.g. in a scenario where the distributed SON is provided as part of the RAN (eNBs and/or gNBs constituting the edge) while the controller comes with a separate stand-alone CSON suite. In such cases, it is better to have a clear framework defining how the functions at the different levels may be controlled in a coordinated way.

The concepts discussed in the prior art account for the cognition challenges but do not account for the fact that the functionalities may exist in different domains which may be provided by different vendors. A single (typically centralized) control and coordination function is unable to effectively coordinate the distributed functions from other vendors. Such centralized control and coordination function may even require more frequent signaling in order to synchronize the timing, knowledge and understanding of the different events in the different vendors' domains and/or or operation domains. Some example embodiments of the invention provide for a cross domain mechanism that enables coordinated control between the plural domains. The domains (or portions thereof) may be supplied from different vendors or from a single vendor.

Figure 1:
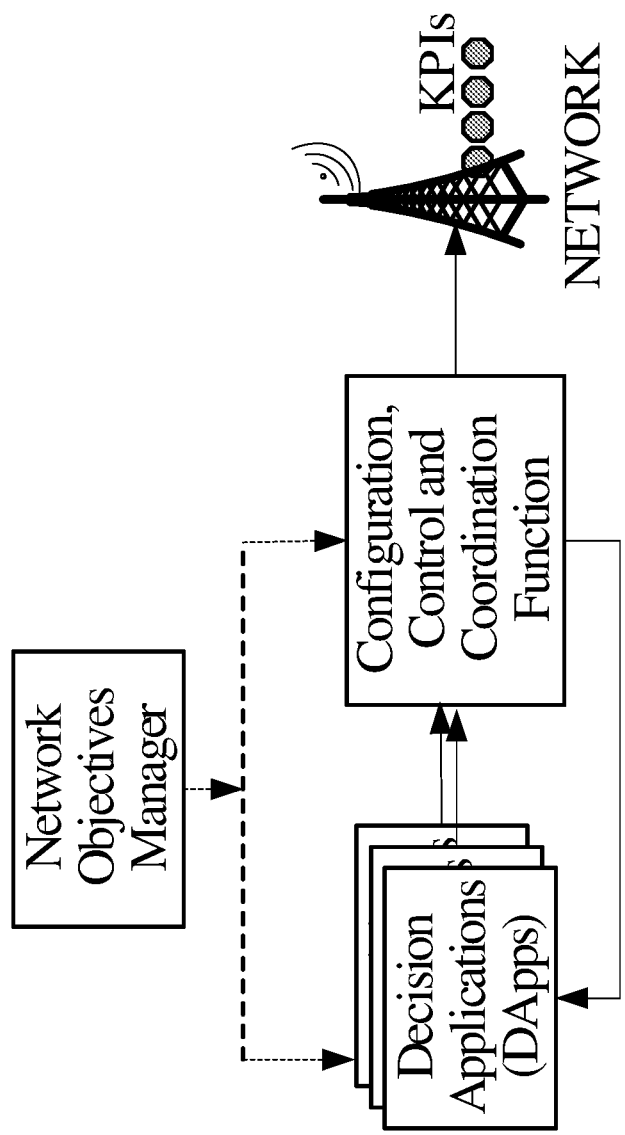
FIG. 1 shows the C3F within the Cognitive Network Management system.
Figure 2:
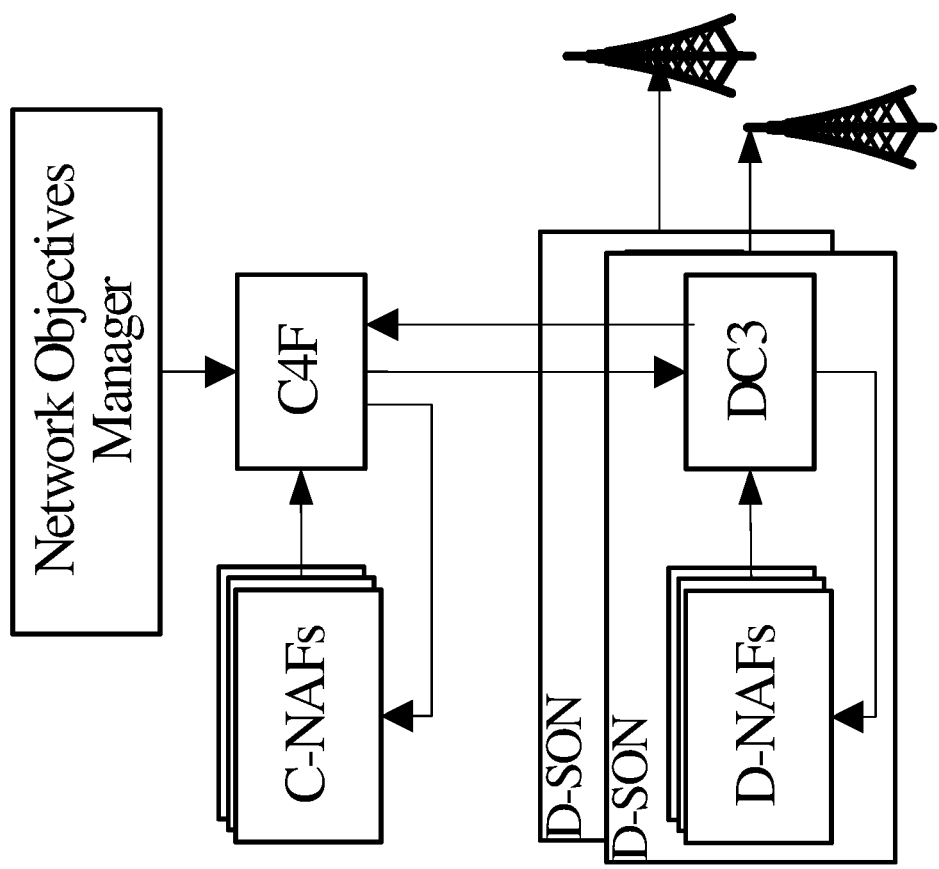
FIG. 2 shows a split hierarchical implementation of control, coordination, and configuration of Network Automation Functions according to some example embodiments of the invention.

According to some example embodiments of the invention, the Control Coordination & Configuration Functionality for NAFs is split into a hierarchy of coordinators. Each of the coordinators is responsible for a specific domain (or subdomain) The coordinators exchange information that allows lower-hierarchy coordinators (coordinators lower in the hierarchy) to account for the actions of higher-hierarchy coordinators (coordinators higher in the hierarchy). In some example embodiments, as illustrated by FIG. 2, the local distributed function (DC3) is separated from the centralized function (C4F), wherein the two functions are coordinated via a service-based management interface.

Some example embodiments of the invention provide at least one of the following features:

The control and coordination functionality is split among two functions—a distributed function, e.g. called the Distributed Control Coordination & Configuration (DC3), and a centralized function, e.g. called the Centralized Control Coordination & Configuration Function (C4F).

The DC3, typically located in the edge cloud or NE, manages (i.e. it controls, coordinates & configures) the local D-NAFs at each network element. The coordination by the DC3 may occur at a fairly high frequency since the D-NAFs may be capable of very short (near real-time) optimization loops.

The C4F, typically located in the OAM, manages network-wide performance Consequently, it manages the multiple DC3s under its jurisdiction. The coordination by the C4F may occur at a slow frequency (compared to that by DC3) since management information (on which optimization is based) is typically not instantaneously available.

The control, coordination & configuration may be exercised over the service-based management interface between the C4F (OAM) and access domains (NEs). The access domains or portions thereof (NEs) may be delivered from a same vendor of from different vendors. The C4F which has a wider view of the network translates the network-wide objectives of a wider context into NE-specific objectives with reduced context for each NE.

For simplicity, hereinafter, the description is based on the assumption that the D-NAFs are NE specific. However, according to some example embodiments, the D-NAFs may be responsible for a few NEs (or cells or other relevant entities), which form a subset of the entirety of the NEs (or cells or other relevant entities).

In detail, control, coordination & configuration may be exercised as follows:

The C4F, which has knowledge of end-to-end network objectives (=general objectives), sends specific performance targets (=specific objectives) for a limited scope (e.g. for one or a few NEs or for one or a few cells) to the respective Distributed NAF(s). For example, it may send the specific objectives to the D-NAF(s) via the DC3(s). Alternatively, C4F may send the specific objectives directly to the respective D-NAF(s) and informs additionally the DC3(s) coordinating these D-NAF(s).

The NE-specific targets (objectives) may be specific to the NE's context, i.e. the C4F takes the generic multi-context targets received from the network objectives manager or from the operator and translates them into context-specific targets for the NEs' Distributed NAFs.

DC3 coordinates the D-NAFs to achieve the set objectives and, where necessary, re-configures the D-NAFs, e.g. if the applied configuration results in unacceptable performance.

DC3 notifies C4F if/when the set objectives cannot be achieved. C4F may respond to such notification by setting new objectives If the network comprises Centralized Network Automation Functions, they may be controlled, coordinated, and configured according to some example embodiments as follows:

The C-NAFs may provide recommendations to the C4F to perform an action on the network (i.e. on one or more NEs of the network). The recommendations may propose an action to achieve a target configuration and/or may propose the target configuration of the network without indicating a specific action. In the latter case, in some example embodiments, C4F may determine the action based on the current configuration and the target configuration. The action may be related to one or more network elements, and may be related to configurations of one or more properties of these network elements.

If multiple C-NAFS concurrently propose actions/target configurations, the C4F decides if all the actions may be concurrently performed or if only a subset (or even none) should be selected. The C4F may either perform the (selected) actions on the network or it may forward the recommendation(s) to the individual DC3, thus instructing DC3 to perform the action onto the network. If the recommendation from C-NAF comprises the target configuration, the forwarded recommendation may either comprise the target configuration, too, or the recommendation may comprise the corresponding action if C4F determines the action. If the C4F performs the (selected) actions or forwards the recommendation(s) may depend on the specific implementation. In some example embodiments, this decision may also depend on the (selected) actions.

In some example embodiments, if the C4F sends the recommendation to the DC3, the DC3 may, as default, perform the action according to the recommendation from the C4F (e.g. when centralized actions are considered as having higher priority). In some example embodiments, DC3 may first consider this recommendation alongside the recommendations from the D-NAFs to select the ones to activate on the NE(s). If the recommendation received from C4F comprises the target configuration, DC3 may determine the relevant action(s).

If the DC3 performs the actions recommended by C4F without considering the recommendations from the D-NAFs or first considers the recommendations from the D-NAFs to select some actions may depend on the specific implementation. In some example embodiments, this decision may also depend on the recommended actions.

If the C4F directly performs the action according to the recommendation on the network, the C4F informs the respective DC3 of the performed action (and/or on the achieved target configuration).

After the changes have had effect, the DC3 notifies C4F of the outcome of the action due to the recommendation. The notification may be in form of AQIs which are sent by all affected DC3s to the C4F.

The C4F also receives AQIs from other C-NAFs which may observe effect from the activated action. The C4F aggregates the AQIs to determine the final quality of the action. C4F may accordingly reconfigure the C-NAF if necessary.

Through this process, the C4F and C-NAFS may learn their behavioural matrix from the multiple interactions with DC3s.

Figure 3:
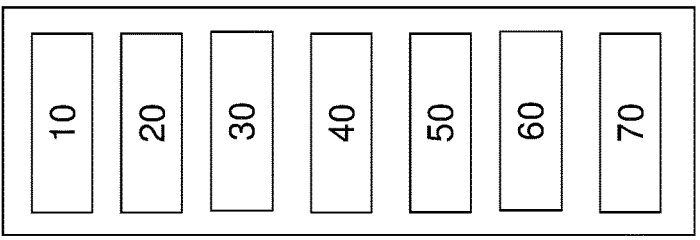
FIG. 3 shows an apparatus according to an embodiment of the invention.
Figure 4:
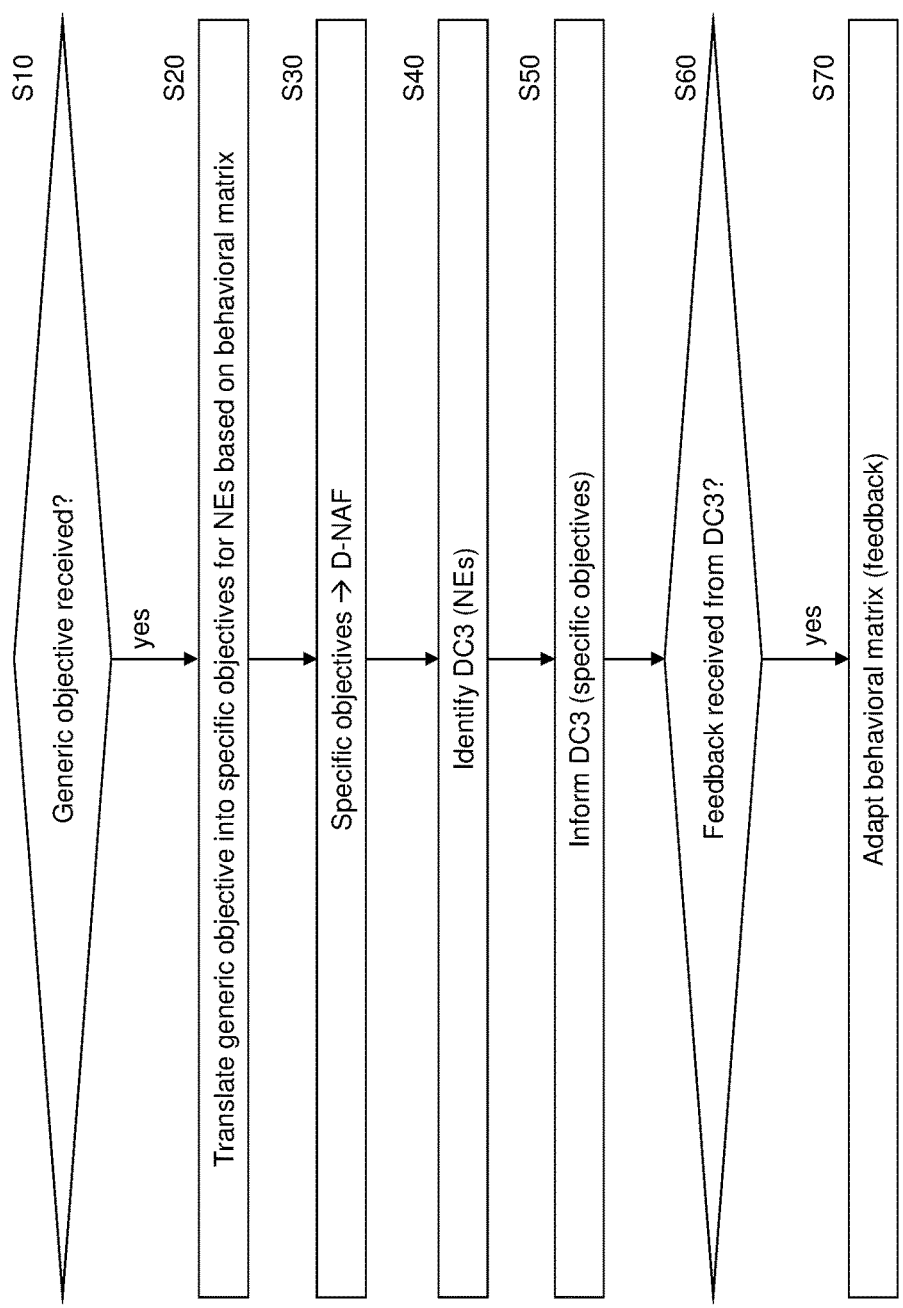
FIG. 4 shows a method according to an embodiment of the invention.

FIG. 3 shows an apparatus according to an embodiment of the invention. The apparatus may be a control function, in particular a central control function such as C4F, or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises means for monitoring 10, means for translating 20, means for requesting 30, means for identifying 40, means for informing 50, means for supervising 60, and means for adapting 70. The means for monitoring 10, means for translating 20, means for requesting 30, means for identifying 40, means for informing 50, means for supervising 60, and means for adapting 70 may be a monitoring means, translating means, requesting means, identifying means, informing means, supervising means, and adapting means, respectively. The means for monitoring 10, means for translating 20, means for requesting 30, means for identifying 40, means for informing 50, means for supervising 60, and means for adapting 70 may be a monitor, translator, requestor, identificator, informer, supervisor, and an adaptor, respectively. The means for monitoring 10, means for translating 20, means for requesting 30, means for identifying 40, means for informing 50, means for supervising 60, and means for adapting 70 may be an monitoring processor, translating processor, requesting processor, identifying processor, informing processor, supervising processor, and adapting processor, respectively.

The means for monitoring 10 monitors if a generic objective for a network is received (S10). The network comprises plural network elements. The network elements may be of one or more domains and from one or more vendors. The apparatus may receive the generic objective from a network objectives manager or from a OAM system.

If the generic objective is received (S10=yes), the means for translating 20 translates the generic objective into plural specific objectives based on a behavioral matrix (S20). Each of the specific objectives is specific for a respective network element of the plural network elements. A specific objective may be specific for a subset of the plural network elements of the network.

For each of the specific objectives obtained in S20, the means for requesting 30 requests an automation function (such as a D-NAF) of the respective network element to achieve the specific objective (S30). Such a request may be explicit or implicit, e.g. by providing the specific objective to the automation function.

For each of the specific objectives obtained in S20, the means for identifying 40 identifies a distributed control function (such as a DC3) controlling the automation function of the respective network element (S40). The identification is made based on a stored association table. In the association table, it is indicated which network element (and/or which automation function (such as D-NAF)) is controlled by which distributed control function (such as DC3).

For each of the specific objectives obtained in S20, the means for informing 50 informs the distributed control function identified in S40 on the specific objective for the respective network element (S50).

S30 and the pair of S40 and S50 may be performed in an arbitrary sequence. They may be performed fully or partly in parallel. In some example embodiments, the apparatus may request the automation functions via the respective DC3. In such embodiments, the apparatus performs S30 and S50 at once.

The means for supervising 60 supervises if a feedback is received from one of the distributed control functions (S60). The feedback indicates if or to which degree one of the specific objectives is achieved.

If the feedback is received (S60=yes), the means for adapting 70 adapts the behavioral matrix based on the feedback (S70).

Figure 6:
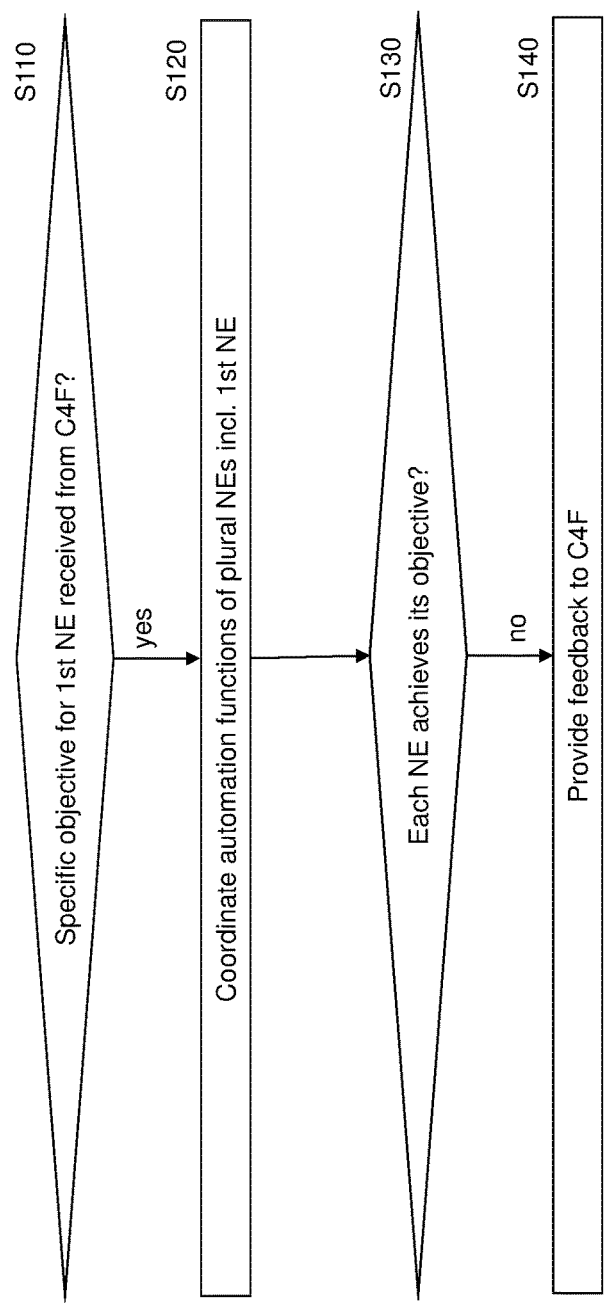
FIG. 6 shows a method according to an embodiment of the invention.
Figure 5:
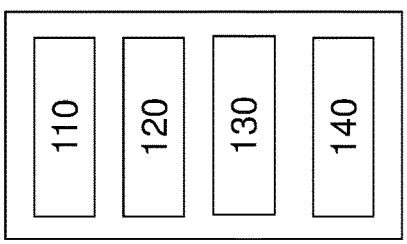
FIG. 5 shows an apparatus according to an embodiment of the invention.

FIG. 5 shows an apparatus according to an embodiment of the invention. The apparatus may be a control function, in particular a distributed control function, such as a DC3, or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for monitoring 110, means for coordinating 120, means for supervising 130, and means for providing 140. The means for monitoring 110, means for coordinating 120, means for supervising 130, and means for providing 140 may be a monitoring means, coordinating means, supervising means, and providing means, respectively. The means for monitoring 110, means for coordinating 120, means for supervising 130, and means for providing 140 may be a monitor, coordinator, supervisor, and a provider, respectively. The means for monitoring 110, means for coordinating 120, means for supervising 130, and means for providing 140 may be a monitoring processor, coordinating processor, supervising processor, and providing processor, respectively.

The means for monitoring 110 monitors if a specific objective for a first network element is received from a central control function such as C4F (S110).

If the specific objective is received (S110=yes), the means for coordinating 120 coordinates automation functions of plural network elements, thus attempting to achieve specific objectives of the plural network elements (S120). The plural network elements include the first network element. The specific objection for the first network element is one of the specific objectives which the means for coordinating 120 attempts to achieve. At least some of the other specific objectives may be received previously, or together with the specific objective for the first network element from the central control function, and/or at least some of the other specific objections may be input previously directly or via the automation functions into the means for coordinating 120. There may be more than one specific objective for one or more of the network elements.

The means for supervising 130 supervises if each of the plural network elements including the first network element achieves its respective specific objective (S130).

If one of the plural network elements does not achieve its respective specific objective (S130=no), the means for providing 140 provides a feedback to the central control function. The feedback indicates that one of the plural network elements does not achieve its respective specific objective. The means for providing 140 may also indicate to the central control function, as another feedback, to which degree one of the plural network elements achieves its respective specific objective if the one of the plural network elements achieves its respective specific objective.

Figure 7:
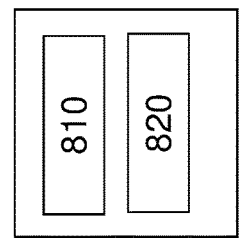
FIG. 7 shows an apparatus according to an embodiment of the invention.

FIG. 7 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 4 and 6 and related description.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

The invention is not limited to a 3GPP network such as a 5G network. It may be employed in other 3GPP networks such as 3G networks, 4G networks, or future 3GPP networks. It may be employed in wireless communication networks different from 3GPP networks such as WiFi networks, or in wired communication networks such as Ethernet networks. It may be employed in other networks different from communication networks, too, which comprise a central OAM and distributed SONs (or a comparable functionality).

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities may be embodied in the cloud.

According to the above description, it should thus be apparent that example embodiments of the present invention provide, for example, a control function, more specifically a configuration, control, and coordination function such as a C4F or a DC3 or a UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
   at least one processor; and
   at least one memory storing instructions that, when executed by the at least one processor, cause the apparatus to perform:
   monitoring for receipt of a generic objective for a network comprising a plurality of network elements;
   translating the generic objective into a plurality of specific objectives based on a behavioral matrix based on the receipt of the generic objective, wherein each of the specific objectives is specific for a respective network element of the plurality of network elements;
   requesting, for each of the specific objectives, an automation function of the respective network element to achieve the specific objective,
   identifying, for each of the specific objectives, based on a stored association table, a distributed control function controlling the automation function of the respective network element;
   informing, for each of the specific objectives, the identified distributed control function on the specific objective for the respective network element;
   supervising when a feedback is received from one of the distributed control functions, wherein the feedback indicates if or to which degree one of the specific objectives is achieved;
   adapting the behavioral matrix based on the feedback;
   checking that the feedback indicates that the specific objective is not achieved;
   translating the generic objective based on the adapted behavioral matrix,
   generating, for one network element of the plurality of network elements, a plurality of specific contexts based on a generic context for the network;
   translating, for the one network element of the plurality network elements, the generic objective into a plurality of specific objectives of the specific objectives, wherein each specific objective of the plurality of specific objectives for the one network element of the plurality of network elements is related to a respective specific context of the plurality of specific contexts;
   providing each specific objective of the plurality of specific objectives along with an indication of the respective specific context to the automation function of the one network element of the plurality of network elements;
   informing the identified distributed control function on the plurality of specific objectives for the one network element of the plurality of network elements along with an indication of the respective specific context;
   observing that a recommendation for target configuration of one of the network elements from a central automation function;
   deciding whether or not the recommendation is accepted when the recommendation is received;
   identifying, based on the stored association table, the distributed control function controlling the automation function of the one of the network elements based on the acceptance;
   informing the identified distributed control function on the recommendation based on the acceptance;
   performing an action on the one of the network elements to achieve the target configuration based on the acceptance;
   deciding whether or not the performing is to be performed; and
   inhibiting the performing when the deciding decides that the performing is not to be performed.

2. An apparatus, comprising:
   at least one processor; and
   at least one memory storing instructions that, when executed by the at least one processor, cause the apparatus to perform:
   monitoring for receipt of a specific objective for a first network element from a central control function;
   coordinating, based on the receipt of the specific objective, automation functions of a plurality of network elements including the first network element, thus attempting to achieve specific objectives for the network elements of the plurality of network elements including the specific objective for the first network element;
   supervising if each network element of the plurality of network elements achieves its respective specific objective;
   providing, to the central control function, a feedback indicating that one network element of the plurality of network elements does not achieve its respective specific objective if one network element of the plurality of network elements does not achieve its respective specific objective;
   checking that the feedback indicates that the specific objective is not achieved;
   translating a generic objective based on an adapted behavioral matrix,
   generating, for one network element of the plurality of network elements, a plurality of specific contexts based on a generic context for the network;
   translating, for the one network element of the plurality network elements, the generic objective into a plurality of specific objectives of the specific objectives, wherein each specific objective of the plurality of specific objectives for the one network element of the plurality of network elements is related to a respective specific context of the plurality of specific contexts;
   providing each specific objective of the plurality of specific objectives along with an indication of the respective specific context to the automation function of the one network element of the plurality of network elements;
   informing the identified distributed control function on the plurality of specific objectives for the one network element of the plurality of network elements along with an indication of the respective specific context;
   observing that a recommendation for target configuration of one of the network elements from a central automation function;
   deciding whether or not the recommendation is accepted when the recommendation is received;
   identifying, based on a stored association table, the distributed control function controlling the automation function of the one of the network elements based on the acceptance;
   informing the identified distributed control function on the recommendation based on the acceptance;

performing an action on the one of the network elements to achieve the target configuration based on the acceptance;
deciding whether or not the performing is to be performed; and
inhibiting the performing when the deciding decides that the performing is not to be performed.

3. The apparatus according to claim 2, wherein
the providing is configured to indicate to the central control function to which degree one network element of the plurality of network elements achieves its respective specific objective if the one network element of the plurality of network elements achieves its respective specific objective.

4. The apparatus according to claim 2, wherein
the monitoring is configured to monitor if a recommendation for a target configuration of one of the network elements is received from the central control function; and
the coordinating is configured to coordinate the automation functions taking into account the recommendation if the recommendation is received.

5. The apparatus according to claim 4, wherein the at least one memory and the instructions, with the at least one processor, further cause the apparatus to perform: performing an action on the one of the network elements to achieve the target configuration if the recommendation is received.

6. The apparatus according to claim 5, wherein
the coordinating is configured to decide whether or not the action on the one of the network elements is to be performed if the recommendation is received; and
wherein the at least one memory and the instructions, with the at least one processor, further cause the apparatus to perform
inhibiting the performing if the coordinating decides that the action on the one of the network elements is not to be performed.

7. A method, comprising:
monitoring for receipt of a generic objective for a network comprising a plurality of network elements;
translating the generic objective into a plurality of specific objectives based on a behavioral matrix based on the receipt of the generic objective, wherein each of the specific objectives is specific for a respective network element of the plurality of network elements;
requesting, for each of the specific objectives, an automation function of the respective network element to achieve the specific objective;
identifying, for each of the specific objectives, based on a stored association table, a distributed control function controlling the automation function of the respective network element;
informing, for each of the specific objectives, the identified distributed control function on the specific objective for the respective network element;
supervising receipt of a feedback from one of the distributed control functions, wherein the feedback indicates if or to which degree one of the specific objectives is achieved;
adapting the behavioral matrix based on the feedback;
checking that the feedback indicates that the specific objective is not achieved;
translating the generic objective based on the adapted behavioral matrix,
generating, for one network element of the plurality of network elements, a plurality of specific contexts based on a generic context for the network;
translating, for the one network element of the plurality network elements, the generic objective into a plurality of specific objectives of the specific objectives, wherein each specific objective of the plurality of specific objectives for the one network element of the plurality of network elements is related to a respective specific context of the plurality of specific contexts;
providing each specific objective of the plurality of specific objectives along with an indication of the respective specific context to the automation function of the one network element of the plurality of network elements;
informing the identified distributed control function on the plurality of specific objectives for the one network element of the plurality of network elements along with an indication of the respective specific context;
observing that a recommendation for target configuration of one of the network elements from a central automation function;
deciding whether or not the recommendation is accepted when the recommendation is received;
identifying, based on the stored association table, the distributed control function controlling the automation function of the one of the network elements based on the acceptance;
informing the identified distributed control function on the recommendation based on the acceptance;
performing an action on the one of the network elements to achieve the target configuration based on the acceptance;
deciding whether or not the performing is to be performed; and
inhibiting the performing when the deciding decides that the performing is not to be performed.

* * * * *